Patented Apr. 18, 1950

2,504,382

UNITED STATES PATENT OFFICE 2,504,382

MITICIDAL COMPOSITIONS COMPRISING A 2,2 - BIS (PARA - ALKOXYPHENYL) - PROPANE

Euclid W. Bousquet, Wilmington, Del., James H. Cochran, Clemson, S. C., and Charles J. Krister, Claymont, Del., assignors to E. I. du Pont de Nemours & Company, Wilmington, Del., a corporation of Delaware No Drawing. Application April 26, 1948, Serial No. 23,406

4 Claims. (Cl. 167—30)

The invention relates to miticidal, or mite killing, compositions and methods employing as an essential active ingredient a 2,2-bis(para-alkoxyphenyl)propane in which the alkyl radical in the alkoxyphenyl group is normal alkyl ($n$—$C_nH_{2n+1}$—) containing 1 thru 4 carbon atoms.

The 2,2-bis(para-alkoxyphenyl)propane compounds employed in the compositions and methods of the invention are represented by the formula

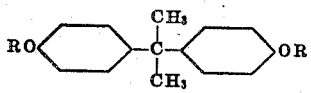

wherein R is n-alkyl containing 1 thru 4 carbon atoms. In other words, the compounds are 2,2-bis(p-methoxyphenyl)propane; 2,2 - bis(p-ethoxyphenyl)propane; 2,2-bis(p-n-propoxyphenyl)-propane, and 2,2-bis(p-n-butoxyphenyl)propane.

It is an object of this invention to provide compositions and methods for the control of mites. It is a further object to provide solutions, water-dispersible liquids, dusts and water-dispersible powders which are effective in killing mites in all stages of their development; as eggs, as nymphs or immature mites, and as adult or mature mites. A still further object is to provide mite killing compositions which may be used for protecting growing plants against mite infestation without injuring the plants. Another object is to provide miticidal compositions which have residual action, that is, compositions which remain toxic to mites and their eggs for an extended period of time after application. Still other objects will become apparent hereinafter.

The foregoing and other objects of the invention are attained by means of compositions containing a 2,2-bis(para-alkoxyphenyl)propane responding to the formula and definition set out above in admixture with an adjuvant having dispersing properties. The compositions of the invention are characterized by the admixture of a dispersing agent with a 2,2-bis(para-alkoxyphenyl)propane and these compositions may also be formulated with other appropriate adjuvants to give miticidal compositions in the form of solutions, water-dispersible liquids, dusts and water-dispersible powders.

The 2,2-bis(para-alkoxyphenyl)propanes are prepared by condensing phenol with acetone in the presence of a dehydrating catalyst such as sulfuric acid or aluminum chloride. 2,2-bis(p-hydroxyphenyl)propane is thus obtained and this compound is etherified by reaction with a suitable dialykyl sulfate to give a 2,2-bis(para-alkoxyphenyl)propane of the type described above.

Alternatively, in preparing a 2,2-bis(p-alkoxyphenyl) propane, phenol may first be etherified to form a suitable n-alkylphenyl ether and the ether then reacted with acetone to give a toxic compound of the class employed in the compositions and methods of this invention.

2,2-bis(p-methoxyphenyl)propane and 2,2-bis-(p-ethoxyphenyl)propane are low-melting white crystalline solids. The other toxic compounds employed in the compositions and methods of the invention; namely, 2,2-bis(p-n-propoxyphenyl)-propane and 2,2-bis(p-n-butoxyphenyl)propane are oily liquids at or about room temperature.

In preparing the compositions of the invention, a 2,2-bis(p-alkoxyphenyl)propane is admixed with a surface active agent of the type used to impart dispersibility of an organic liquid composition or a powder in water. Such agents will be referred to herein as dispersing agents since they cause the compositions of the invention, whether in liquid or in powdered form, to be easily dispersed in water to give aqueous spray compositions. Such agents when used in admixture with an organic liquid composition are sometimes also referred to in the art as emulsifying agents since the dispersion of the organic liquid in water which they promote is an emulsion.

Where a water-dispersible organic liquid composition containing a 2,2-bis(p-alkoxyphenyl)propane is desired, the dispersing agent used is preferably one that is soluble in the organic liquid. Typical of such oil-soluble dispersing, or emulsifying, agents are the amine salts of oleic acid, the sulfonated animal and vegetable oils such as sulfonated fish and castor oils, sulfonated petroleum oils, glycerol monostearate, sorbitan tristearate, diglycol oleate, diethylene glycol laurate, pentaerythritol monostearate, phthalic glycerol alkyd resins, and polyethylene oxides.

In the preparation of water-dispersible powdered compositions of the invention, the oil-soluble dispersing agents of the type illustrated above may be used and other dispersing agents which are not generally thought of as oil-soluble may also be employed. Examples of the latter are the calcium or sodium salts of lignin sulfonic acid such as goulac, polyvinyl alcohols, and the sodium salts of sulfonated condensation products of naphthalene and formaldehyde.

Other dispersing agents are listed in detail in U. S. Dept. of Agriculture Bulletin E–607 and in an article by McCutcheon in Chemical Industries, November 1947, page 811, entitled "Synthetic detergents."

The amount of dispersing agent used in the compositions of the invention will vary with the dispersing properties of the particular adjuvant used and will be varied too with the particular use for which the composition is intended. Generally the dispersing agent will not comprise more than about 10% by weight of the composition and with the better adjuvant materials, the percentage will be 5% or less.

The compositions of the invention consisting of a 2,2-bis(p-alkoxyphenyl)propane in admixture with a dispersing agent may be used as such in the preparation of aqueous spray compositions or, alternatively, they may be diluted with solvents to give solutions and water-dispersible liquids, or they may be diluted with finely-divided inert powders to give dusts and water-dispersible powders.

It is preferred, according to this invention, to prepare miticidal concentrates, that is, solutions or dusts containing the toxicant in high concentration. These concentrates are then dispersed or diluted before actual application. Such dispersion or dilution is obtained by mixing the compositions with additional amounts of diluent solvents or dusts, or more preferably by dispersing the compositions in water to give aqueous emulsions or suspensions which are readily applied by means of the conventional insecticidal spray equipment.

In preparing the water-dispersible dust compositions of the invention, the finely-divided inert powder used as a diluent is preferably selected from the class consisting of talcs, pyrophyllite, natural clays, and diatomaceous earths. Other powdered inert diluents which may be used in dust compositions include powders such as calcium phosphate, calcium carbonate, magnesium carbonate, sulfur, lime, and flours such as walnut shell, wheat, redwood, soya bean, and cottonseed.

Various solvents may be used if it is desired to prepare solutions containing 2,2-bis(p-alkoxyphenyl)propane and a dispersing agent. Typical solvents are kerosene, trichloroethylene, tetrachloroethylene, alkylated naphthalene, xylene, toluene, cyclohexanone, and acetone. One should be careful, however, in the selection of a solvent diluent if it is desired to apply a solution to growing crops since many of the common solvents tend to damage plants.

The concentration of the toxicant in the miticidal concentrates may be varied widely. For example, compositions in the form of dusts or water-dispersible powders containing one of the solid toxicants; namely, 2,2-bis(p-methoxyphenyl)propane or 2,2-bis(p-ethoxyphenyl)propane can be prepared containing from 1 to about 65% of the toxicant. If one of the liquid toxicants; namely, 2,2-bis(p-propoxyphenyl)propane or 2,2-bis(p-butoxyphenyl)propane is used, the maximum concentration in a dust is somewhat lower. In liquid compositions using the latter liquid toxicants, the toxicant may be present in amounts as high as 95% or more. The maximum obtainable concentrations using solid toxicants in the preparation of solutions will, of course, vary widely according to the solubility of the toxicant in the particular solvent selected. In actual application to vegetation or agricultural crops, however, the toxicant is applied in the form of a dust or spray containing from about 0.05 to 5.0% of the 2,2-bis(p-alkoxyphenyl)propane.

In applying a 2,2-bis(p-alkoxyphenyl)propane for the control of mites and their eggs, the miticidal compositions are applied directly on the area or locus which is to be protected from mite infestation in amount sufficient to exert a miticidal action. It is not necessary that the compositions be applied directly to the mites. The compositions have considerable residual effect and may be applied in advance of a possible mite infestation. The compositions thus applied remain toxic to mites and their eggs for a period of two or three weeks, the period varying of course with the "dosage" of the application, the physical characteristics of the particular composition employed, and the weather conditions. The compositions are unusually effective mite ovicides.

While the compositions of the invention include as an essential active ingredient a 2,2-bis(p-alkoxyphenyl)propane in admixture with a dispersing agent, they may also include insect toxicants, bactericides, and fungicides such as those disclosed in U. S. Patent 2,426,417.

The invention is illustrated further by reference to the following examples:

*Example I*

The liquid toxicant, 2,2-bis(p-n-butoxyphenyl)propane, is mixed with the dispersing agent, sorbitan tristearate, in proportions to give 95% by weight of the toxicant and 5% by weight of the dispering agent.

The above composition is an oily liquid concentrate and is readily dispersible in water to provide aqueous spray compositions. By dispersing the above concentrate in water to give an emulsion containing 0.1 to 0.2 % by weight of 2,2-bis(p-n-butoxyphenyl)propane, a spray composition is obtained which is adapted for application to apple trees for the protection of the trees against infestation by mites.

Illustrations of the important species of mites which attack crops and against which the compositions of Example I and the other compositions of this invention are suitably applied are: two-spotted mite, citrus red mite, apple bud mite, cyclamen mite, apple red spider, European red mite, common red spider, blackberry mite, Pacific mite, citrus rust mite, pear leaf blister mite, Pacific-spotted mite, and Willamette mite.

*Example II*

The following is an example of a dust and water-dispersible powder composition of the invention. It is prepared by mixing the ingredients tabulated below to obtain a finely-divided solid.

10% 2 2-bis(p-ethoxyphenyl)propane
85% fuller's earth (average particle size less than 40 microns)
5% Goulac The composition of this example is applied as a dust or more preferably it is dispersed in water to form an aqueous suspension for application as a spray for the control of mites and their eggs.

Example III

Following is a solution or water-dispersible liquid composition of the invention:

45% 2,2-bis(p-n-propoxyphenyl)propane
45% alkylated naphthalene
10% diethyl cyclohexylamine dodecyl sulfate The composition of this example is readily dispersible in water. A spray composition well suited for the control of mites is obtained by dispersing a quart of the above formulation in 100 gallons of water.

We claim:

1. A miticidal composition comprising in admixture with a surface active agent in amount effective for imparting water dispersibility to the composition, a 2,2-bis(para-alkoxyphenyl)propane in amount sufficient to exert a miticidal action, said 2,2-bis(para-alkoxyphenyl)propane being represented by the formula

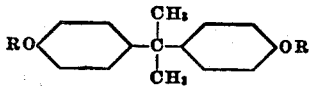

where R is n-alkyl containing 1 thru 4 carbon atoms.

2. A miticidal composition comprising 2,2-bis-(para-butoxyphenyl)propane in amount sufficient to exert a miticidal action in admixture with a surface active agent in amount effective for imparting water dispersibility to the composition.

3. A miticidal composition comprising 2,2-bis-(para-propoxyphenyl)propane in amount sufficient to exert a miticidal action in admixture with a surface active agent in amount effective for imparting water dispersibility to the composition.

4. A miticidal composition comprising 2,2-bis-(para-ethoxyphenyl)propane in amount sufficient to exert a miticidal action in admixture with a surface active agent in amount effective for imparting water dispersibility to the composition.

EUCLID W. BOUSQUET.
JAMES H. COCHRAN.
CHARLES J. KRISTER.

REFERENCES CITED

The following references are of record in the file of this patent:

Yohe et al., J. Am. Chem. Soc. 57, 2259–60 (1935).

Busvine, J. Soc. of Chem. Ind., Nov. 1946, pp. 356–360.